United States Patent
Sparrold

(10) Patent No.: US 7,145,734 B2
(45) Date of Patent: Dec. 5, 2006

(54) WINDOWED OPTICAL SYSTEM HAVING A TILTED OPTICAL ELEMENT TO CORRECT ABERRATIONS

(75) Inventor: Scott Sparrold, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/909,940

(22) Filed: Aug. 3, 2004

(65) Prior Publication Data

US 2006/0028737 A1 Feb. 9, 2006

(51) Int. Cl.
*G02B 13/18* (2006.01)
*G02B 3/02* (2006.01)
*F41G 7/00* (2006.01)
*F42G 15/01* (2006.01)
*F42B 10/00* (2006.01)

(52) U.S. Cl. ...................... 359/708; 244/3.16
(58) Field of Classification Search ................ 359/642, 359/754, 811, 708; 244/3.16
See application file for complete search history.

(56) References Cited

U.S. PATENT DOCUMENTS

| | | | |
|---|---|---|---|
| 4,168,813 A | * | 9/1979 | Pinson et al. ............... 244/3.16 |
| 4,245,890 A | | 1/1981 | Hartman et al. |
| 4,384,759 A | | 5/1983 | Ferrante |
| 4,407,465 A | * | 10/1983 | Meyerhoff ................. 244/3.16 |
| 4,641,927 A | | 2/1987 | Prescott et al. |
| 5,946,143 A | | 8/1999 | Whalen |
| 6,009,564 A | | 1/2000 | Tackles et al. |
| 6,028,712 A | | 2/2000 | McKenney et al. |
| 6,201,230 B1 | * | 3/2001 | Crowther et al. .......... 244/3.16 |
| 6,310,730 B1 | | 10/2001 | Knapp et al. |
| 6,313,951 B1 | | 11/2001 | Manhart et al. |
| 6,343,767 B1 | | 2/2002 | Sparrold et al. |
| 6,356,396 B1 | * | 3/2002 | Chen et al. .................. 359/642 |
| 6,462,889 B1 | | 10/2002 | Jackson |
| 6,484,966 B1 | * | 11/2002 | Steiner et al. ............. 244/3.11 |
| 6,552,318 B1 | | 4/2003 | Crowther et al. |
| 2001/0013565 A1 | * | 8/2001 | Davidovitch ............... 244/3.16 |

\* cited by examiner

*Primary Examiner*—Alicia M Harrington
(74) *Attorney, Agent, or Firm*—Thomas J. Finn; Leonard A. Alkov; Karl A. Vick

(57) ABSTRACT

A system includes a dome window and an optical system having a central optical path that passes through the dome window. The optical system includes a refractive optical element having an axis of symmetry which passes through the optical element and which is tilted relative to the central optical path at a location where the central optical path and the axis of symmetry intersect within the optical element.

22 Claims, 3 Drawing Sheets

WINDOWED OPTICAL SYSTEM HAVING A TILTED OPTICAL ELEMENT TO CORRECT ABERRATIONS

This invention relates to optical systems and, more particularly, to the correction of aberrations produced when the central optical path of the optical system passes through a concentric dome window.

BACKGROUND OF THE INVENTION

Many advanced missiles utilize a generally forward-facing optical sensor to guide the missile to its target. The sensor (or, equivalently for the present purposes, a portion of the optical train that directs the incoming optical rays along an optical path from the scene to the sensor) is usually pivotably mounted so that the sensor may be directed to point in directions other than along the boresight axis (i.e., the axis of symmetry of the fuselage) of the missile. The sensor views the scene in front of the missile through a forward-facing dome window. The dome window protects the sensor from the high-velocity air stream and from impacts by water droplets, ice, dust, and other particles that are present in the air.

In some designs, the optical path of the sensor is coincident with a cylindrical axis of symmetry of the dome window when the optical train is pointed along the boresight axis of the missile. However, in other cases, the optical path of the forward-sensing sensor is laterally displaced from the axis of symmetry of the dome window when the optical path is pointed parallel to the boresight axis of the missile. The optical path passes through the dome window at a nonperpendicular angle that introduces aberrations into the image on the optical path. Such situations arise, for example, for a nose-mounted dome window when there are two or more sensors viewing the scene through the same dome window, so that at least one of the sensors must be laterally displaced from the axis of symmetry. They also arise when the sensor is a side-mounted but forward-sensing sensor rather than a nose-mounted forward-sensing sensor.

A decentered optical corrector segment may be positioned between the dome window and the optical train of the sensor to reduce the aberration. The decentered optical corrector segment has a spatially dependent shape that is selected responsive to the shape of the dome window to negate the aberration of the optical rays caused by the passage of the optical path through the dome window. The decentered optical corrector thus functions somewhat in the manner of eyeglasses worn by a human being. This approach, while operable, has drawbacks. Specifically, the fabrication, testing, mounting, and alignment of the decentered optical corrector segment are difficult, and the piece count of the system is high.

There is a need for an improved approach to optical systems wherein the optical path is laterally displaced from the boresight. The present invention fulfills this need, and further provides related advantages.

SUMMARY OF THE INVENTION

The present approach provides an optical system having a central optical path that is laterally displaced from an axis of symmetry of a dome window through which the optical path passes, and/or is laterally displaced from a boresight axis of an aircraft which carries the optical system. The optical system does not utilize a decentered optical corrector and does not utilize an optical corrector that is not rotationally symmetric.

In accordance with the invention, a system comprises a dome window, and an optical system having a central optical path that passes through the dome window. The optical system comprises a refractive optical element having an axis of symmetry which passes through the optical element and which is tilted relative to the central optical path at a location where the central optical path and the axis of symmetry intersect within the optical element.

The refractive optical element may be, for example, a lens having a shape that is not responsive to a shape of the dome window, or an axisymmetric optical corrector having a shape responsive to a shape of the dome window. The optical system may include an optical transceiver in the form of an optical detector, and optical transmitter, or both. There is typically, but not necessarily, a housing to which the dome window is affixed and which encloses at least a portion of the optical system.

In one embodiment of interest, the dome window has an axis of symmetry, and the central optical path is not coincident with the axis of symmetry of the dome window. In another embodiment, the dome window has an axis of symmetry, and at least a portion of the central optical path is parallel to but laterally displaced from the axis of symmetry of the dome window.

The housing, where present, may be an aircraft fuselage of either an unmanned or manned aircraft. In one application, the dome window is affixed to a forward end of the fuselage, and the forward-facing dome window has an axis of symmetry The central optical path is not coincident with the axis of symmetry of the dome window. In another embodiment, the dome window is affixed to a side of the fuselage. The refractive optical element comprises a lens having a shape that is not responsive to a shape of the dome window, and the optical system includes a mirror that reflects the optical path into an interior of the fuselage.

In another embodiment, a system comprises an aircraft including an aircraft fuselage having a boresight axis, and a dome window affixed to the aircraft fuselage. An optical system has a central optical path that passes through the dome window and includes a parallel-portion central optical path that passes through the dome window and may be selectively oriented to lie parallel to and laterally displaced from the boresight axis. The optical system comprises a refractive optical element having an axis of symmetry which is tilted relative to the central optical path at a location where the central optical path and the axis of symmetry intersect within the optical element. The aircraft fuselage encloses at least a portion of the optical system. Other compatible features as discussed herein may be used with this embodiment.

The present approach avoids the use of an asymmetric decentered optical corrector in relation to an off-boresight optical system with an optical path that passes through a dome window. Such decentered optical correctors may be difficult to fabricate, test, mount, and align, and increase the piece count of the system. They also add to the weight of the system.

Instead, an existing optical element used in the imaging system is tilted slightly in the optical path to compensate for the aberrations introduced when the optical path passes through the dome window. The optical compensation achieved with the present approach is comparable to, but not quite as good as, that achieved with the use of an asymmetric decentered optical corrector. However, for many applications the present approach produces satisfactory optical results, and has the important advantage of avoiding the use of the asymmetric decentered optical corrector and the associated problems and limitations.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
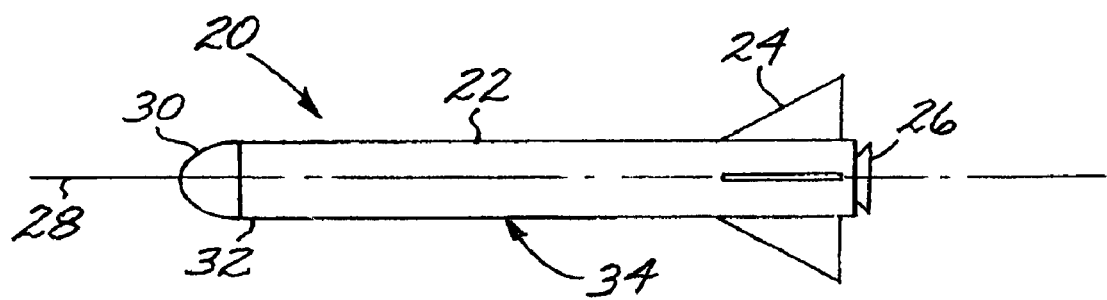
FIG. 1 is an elevational view of an aircraft with a nose-mounted dome window.

FIG. 1 depicts an aircraft 20, in this case an unmanned missile. The aircraft 20 includes a fuselage 22, control surfaces 24 affixed to the fuselage 22, and optionally a propulsion motor 26 such as a rocket engine within the fuselage 22. The fuselage 22 has a longitudinal axis of symmetry, termed a boresight axis 28. There is a dome window 30 affixed to a forward end (i.e., nose) 32 of the fuselage 22. The dome window 30 may be spherical or non-spherical in shape. The fuselage 22 serves as a housing 34 for at least a portion of an optical system to be discussed subsequently. While the fuselage 22 of the unmanned missile aircraft 20 is the currently preferred housing 34, other types of housings such as manned aircraft or other structures may be used as well.

Figure 2:
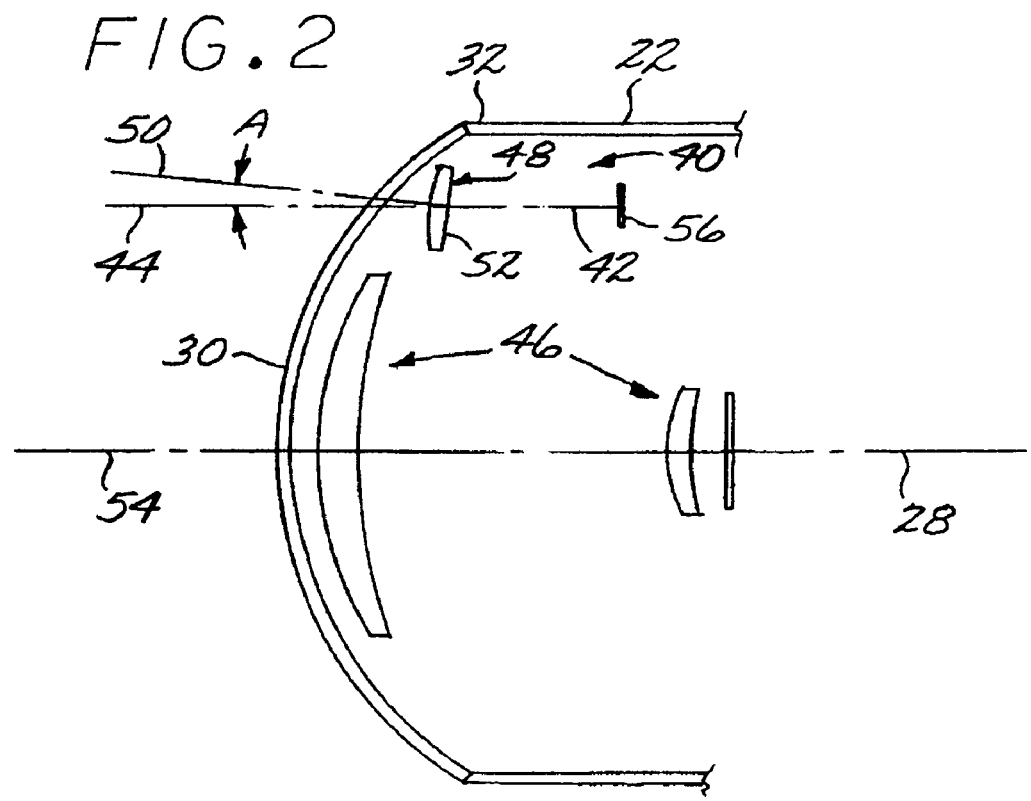
FIG. 2 is a schematic view of an optical system according to the present approach used in conjunction with the aircraft of FIG. 1 and using a tilted refractive optical element.

FIG. 2 depicts an optical system 40 having a central optical path 42 that passes through the dome window 30 mounted to the forward end 32 of the fuselage 22. The illustrated central optical path 42 of the optical system 40 is offset laterally from the boresight axis 28. (The longitudinal direction is parallel to the boresight axis 28, and the lateral direction is perpendicular to the boresight axis 28.) That is, the central optical path 42 includes a parallel-portion central optical path 44 that passes through the dome window 30 and may be selectively oriented to lie parallel to and laterally displaced from the boresight axis 28. As illustrated, the dome window 30 has a rotational axis of symmetry 54 that is coincident with the boresight axis 28. The central optical path 42 of the optical system 40 is not coincident with the axis of symmetry 54 of the dome window 30. The parallel-portion central optical path 44 is laterally offset from the boresight axis 28 because there is a second optical system 46 whose central optical path 42 may be made to lie along and be coincident with the boresight axis 28. The second optical system 46 could instead be a radio-frequency sensor or other device positioned in the nose of the aircraft 20. In any event, the optical system 40 is laterally offset from the boresight axis 28 because there is insufficient room along the boresight axis 28.

The laterally offset optical system 40 includes an axisymmetric refractive optical element 48 having an axis of symmetry 50 which is tilted at an angle A relative to the central optical path 42 at a location where the central optical path 42 and the axis of symmetry 50 intersect within the optical element 48. (In the drawings, the magnitude of angle A is exaggerated so as to be readily identified.) Preferably and as illustrated, the refractive optical element 48 is a lens 52 that is part of the optical system 40 or an added lens, and has a shape that is not responsive to a shape of the dome window 30. That is, the lens 52 is selected to perform as one of the lenses of the optical system 40, such as the illustrated objective lens 52. The refractive optical element 48 may instead be an axisymmetric optical corrector having a shape responsive to a shape of the dome window 30 to negate the aberration of the optical rays caused by the passage of the central optical path 42 through the dome window 30.

The optical system 40 may be a receiver of light energy, in which case it has an optical detector as an optical transceiver 56. The optical system 40 may instead be a transmitter of light energy, in which case there is a light source as the optical transceiver 56. The optical transceiver 56 may include both a light detector and a light transmitter. There may be an optical train including additional reflective or refractive optical elements located in the central optical path 42 between the dome window 30 and the optical transceiver 56.

Figure 3:
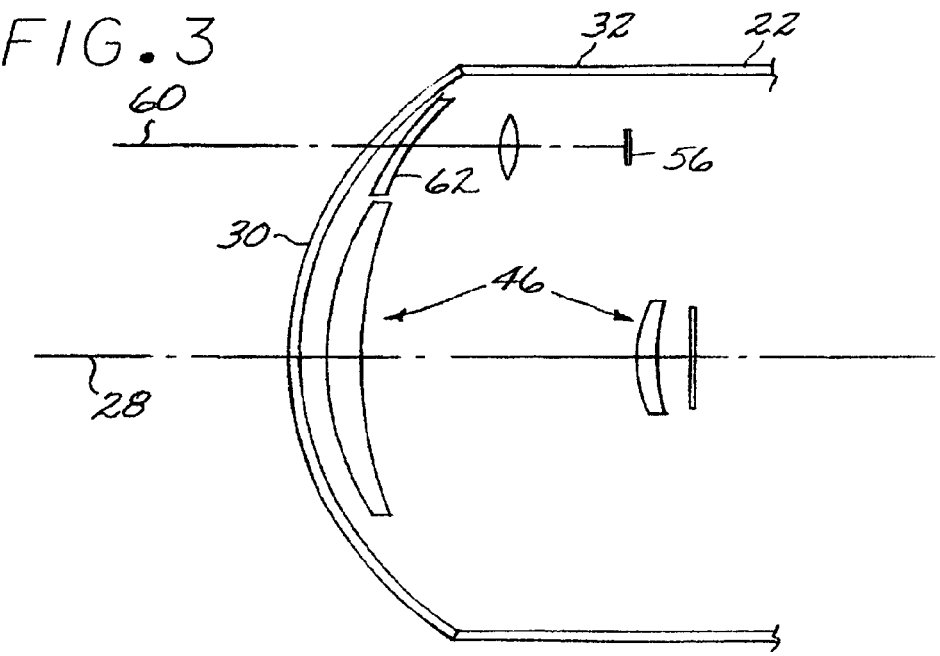
FIG. 3 is a schematic view of an optical system used in conjunction with the aircraft of FIG. 1 and using a decentered optical corrector, which is not within the scope of the present approach.

FIG. 3 illustrates an approach, which is not within the scope of the present invention, in which optical correction of a beam path 60 is achieved using a decentered optical corrector segment 62. The decentered optical corrector segment 62 is a segment of a transparent optical structure having a shape responsive to a shape of the window. The decentered optical corrector segment 62 may be symmetric relative to an axis of symmetry that does not intersect the decentered optical corrector segment 62 and/or is coincident with the boresight axis 28. The optical path and the axis of symmetry of the decentered optical corrector segment 62 therefore do not intersect each other. The approach depicted in FIG. 3 is more difficult and costly to implement than the present approach such as depicted in FIG. 2.

Figure 4:
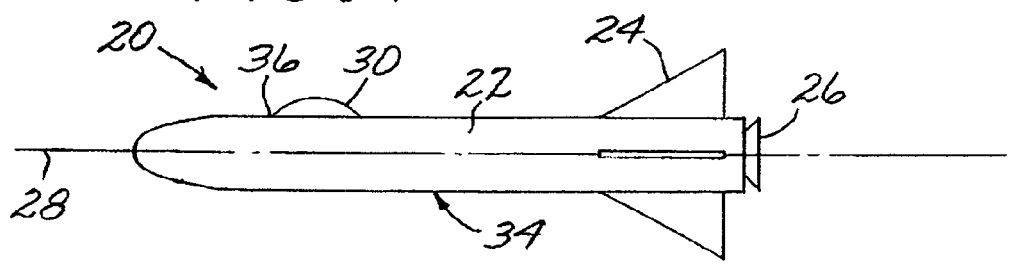
FIG. 4 is an elevational view of an aircraft with a side-mounted dome window.
Figure 5:
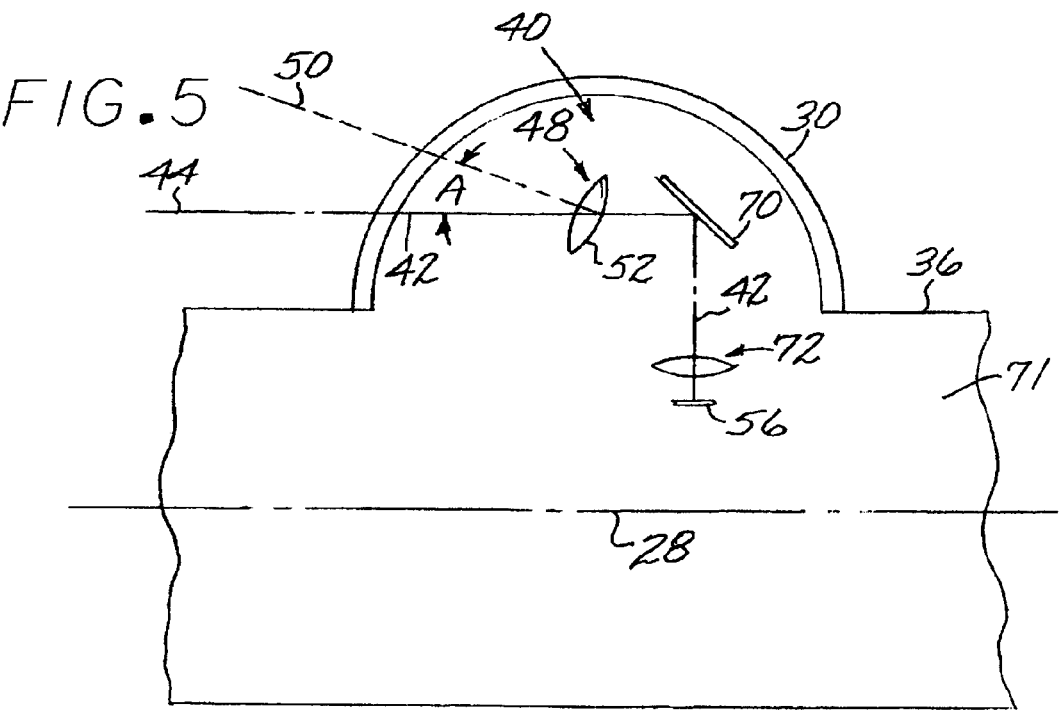
FIG. 5 is a schematic view of an optical system used in conjunction with the aircraft of FIG. 4 and using a tilted objective lens.
Figure 6:
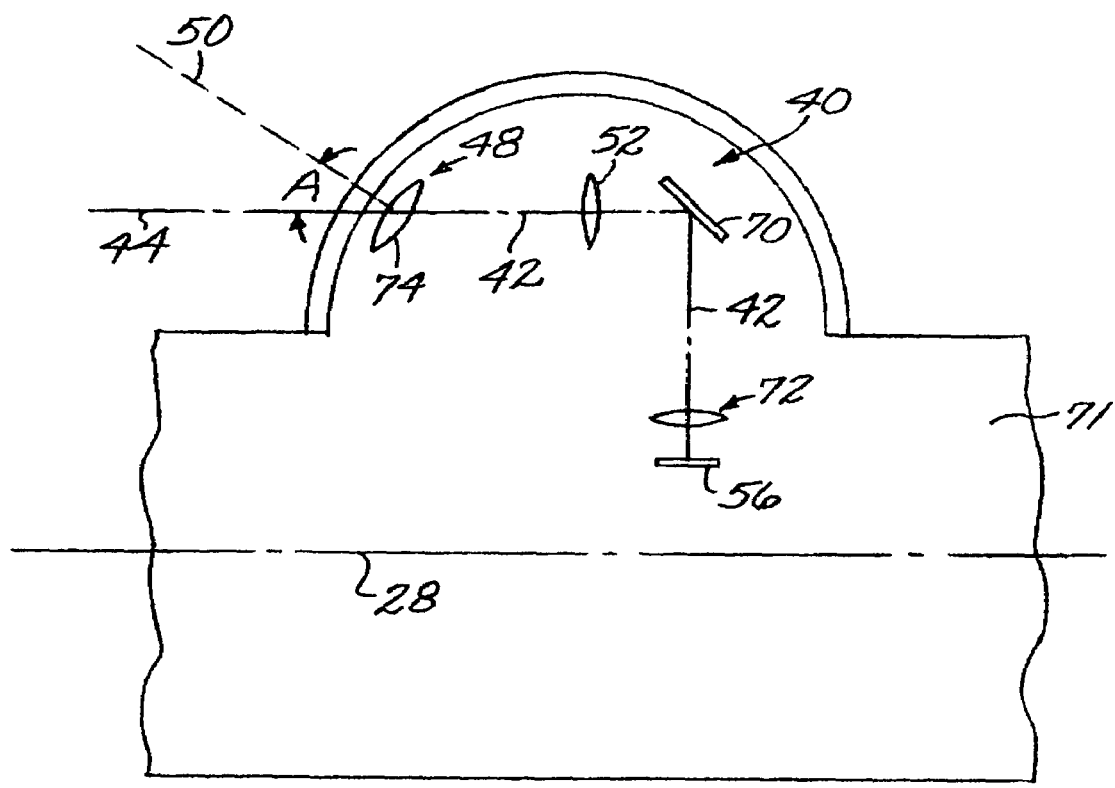
FIG. 6 is a schematic view of an optical system used in conjunction with the aircraft of FIG. 4 and using a tilted optical corrector.

FIGS. 4–6 illustrate another embodiment of the present approach. Applicable common elements are indicated with the same reference numerals as in FIGS. 1–2, and the relevant description of these common elements is incorporated here.

Referring to FIG. 4, the aircraft 20 is similar to the aircraft 20 of FIG. 1, except that the dome window 30 is affixed to a side 36 of the fuselage 22 so that it projects laterally outwardly from the fuselage 22. The optical system 40 depicted in FIG. 5 includes the optical elements described previously in relation to FIG. 2, but additionally has a fold mirror 70 that reflects the central optical path 42 into an interior 71 of the fuselage 22 to the optical transceiver 56. The fold mirror 70 may be rotated about an axis perpendicular to the boresight axis 28 and lying in the plane of the illustration, to steer the central optical path 42 azimuthally, or rotated about an axis perpendicular to the boresight axis 28 and lying perpendicular to the plane of the illustration, to steer the central optical path 42 elevationally. Additionally, there may be a more complex optical train 72 than that illustrated in FIG. 5, which is schematically represented by an additional lens.

In the embodiment of FIG. 5, the refractive optical element 48 is a lens 52 of the optical system 40 or an added lens, whose shape is not responsive to the shape of the dome window 30. In the embodiment of FIG. 6, the refractive optical element 48 is an axisymmetric corrector 74, whose shape is responsive to the shape of the dome window 30. In this embodiment, the central optical path 42 and the axis of symmetry 50 of the axisymmetric corrector 74 intersect within the axisymmetric corrector 74.

Figure 7:
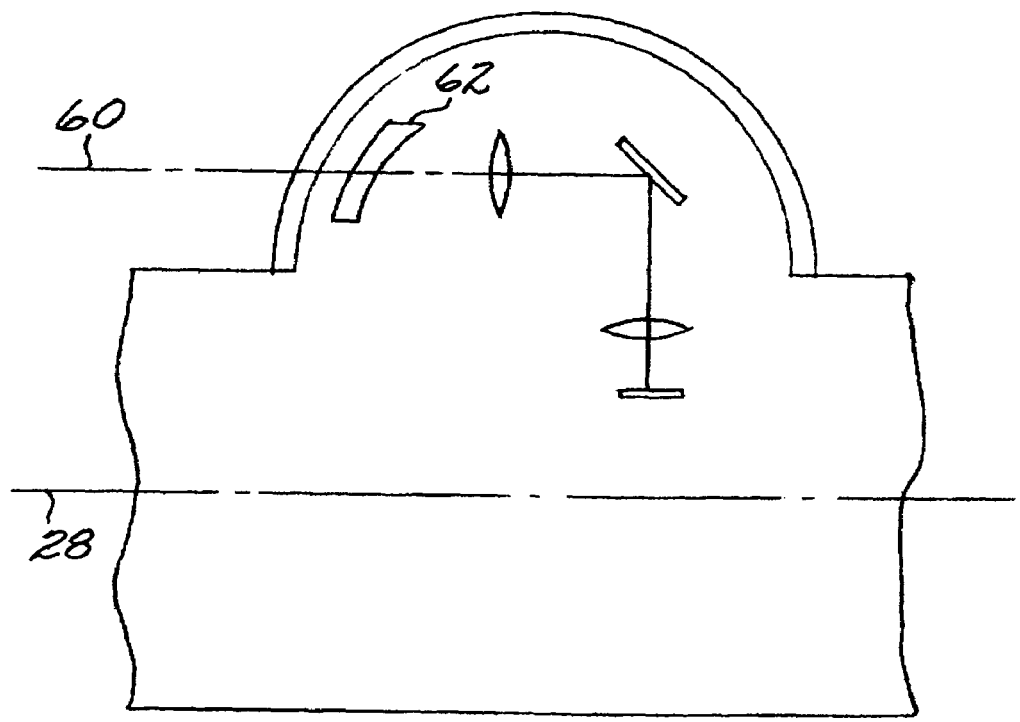
FIG. 7 is a schematic view of an optical system used in conjunction with the aircraft of FIG. 4 and using a decentered optical corrector, which is not within the scope of the present approach.

FIG. 7 illustrates an optical structure that is not within the scope of the invention. As with the optical structure of FIG. 3, the decentered optical corrector segment 62 is a segment of a transparent optical structure having a shape responsive to a shape of the window. The decentered optical corrector segment 62 may be symmetric relative to an axis of symmetry that does not intersect the decentered optical corrector segment 62 and/or is coincident with the boresight axis 28. The optical path and the axis of symmetry of the decentered optical corrector segment 62 therefore do not intersect each other.

The present approach has been computationally simulated and compared with alternative approaches using the Code V™ optical ray tracing program for the side-mounted dome window geometries of FIGS. 4–7. The three cases considered were an absence of correction, a tilted objective-lens corrector according to the present approach as in FIG. 5, and a decentered corrector as in FIG. 7 that is not within the scope of the present invention. For the case of no correction, the geometric spot size was calculated to be 0.037 inches, and the diffraction spot size for an F/3 optical system at 4 micrometers wavelength was 0.0015 inches. For the case of the decentered corrector of FIG. 7 that is not within the scope of the present invention, the geometric spot size was calculated to be 0.0015 inches (about $1/25$ of that of the uncorrected case), and a diffraction spot size of about 0.0015 inches. For the case of the tilted corrector of FIG. 5, the geometric spot size was calculated to be 0.002 inches ($1/18$ of that of the uncorrected case), and a diffraction spot size was calculated to be about 0.0015 inches. The present approach of FIG. 5 yields nearly as great an improvement in the geometric spot size as does the case of the decentered corrector of FIG. 7, but with much less complexity of the optical system, easier fabrication, easier testing, easier mounting, easier alignment, and lower cost. For this reason, the embodiment wherein the tilted refractive optical element is a lens whose shape is not responsive to the shape of the dome window is preferred for applications for which its optical performance is acceptable.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A system comprising
a dome window; and
an optical system having a central optical path that passes through the dome window, wherein the optical system comprises a refractive optical element having an axis of symmetry which passes through the optical element and which is tilted relative to the central optical path at a location where the central optical path and the axis of symmetry intersect within the optical element.

2. The system of claim 1, wherein the refractive optical element comprises a lens having a shape that is not responsive to a shape of the dome window.

3. The system of claim 1, wherein the refractive optical element comprises an axisymmetric optical corrector having a shape responsive to a shape of the dome window.

4. The system of claim 1, wherein at least a portion of the central optical path is parallel to but laterally displaced from the axis of symmetry of the dome window.

5. The system of claim 1, wherein the optical system comprises an optical transceiver on the central optical path.

6. The system of claim 1, wherein the system further includes
a housing to which the dome window is affixed and which encloses at least a portion of the optical system.

7. The system of claim 1, wherein the dome window has an axis of symmetry, and wherein the central optical path is not coincident with the axis of symmetry of the dome window.

8. The system of claim 1, further including an aircraft fuselage having a forward end, wherein the dome window is affixed to the forward end of the fuselage.

9. The system of claim 1, further including an aircraft fuselage having a side, wherein the dome window is affixed to the side of the fuselage.

10. A system comprising
a dome window;
an optical system having a central optical path that passes through the dome window, wherein the dome window has an axis of symmetry, wherein the central optical path is not coincident with the axis of symmetry of the dome window, wherein the optical system comprises a lens having an axis of symmetry which is tilted relative to the central optical path at a location where the central optical path and the axis of symmetry intersect within the optical element, and wherein a shape of the lens is not responsive to a shape of the dome window; and
a housing to which the dome window is affixed and which encloses at least a portion of the optical system.

11. The system of claim 10, wherein at least a portion of the central optical path is parallel to but laterally displaced from the axis of symmetry of the dome window.

12. The system of claim 10, wherein the optical system comprises an optical transceiver on the central optical path.

13. The system of claim 10, wherein the housing is a fuselage of an aircraft, and the dome window is affixed to a forward end of the fuselage.

14. The system of claim 10, wherein the housing is a fuselage of an aircraft, and the dome window is affixed to a side of the fuselage.

15. A system comprising
a dome window;
an optical system having a central optical path that passes through the dome window, wherein the optical system comprises a refractive optical element having an axis of symmetry which passes through the optical element and which is tilted relative to the central optical path at a location where the central optical path and the axis of symmetry intersect within the optical element, wherein the dome window has an axis of symmetry, wherein the central optical path is not coincident with the axis of symmetry of the dome window, and wherein at least a portion of the central optical path is parallel to but laterally displaced from the axis of symmetry of the dome window; and an aircraft including an aircraft fuselage having a forward end to which the dome window is affixed, wherein the aircraft fuselage encloses at least a portion of the optical system.

16. The system of claim 15, wherein the refractive optical element comprises a lens having a shape that is not responsive to a shape of the dome window.

17. The system of claim 15, wherein the refractive optical element comprises an axisymmetric optical corrector having a shape responsive to a shape of the dome window.

18. The system of claim 15, wherein the optical system comprises an optical transceiver on the central optical path.

19. The system of claim 15, wherein the aircraft is unmanned.

20. A system comprising
a dome window;
an optical system having a central optical path that passes through the dome window, wherein the optical system comprises a refractive optical element having an axis of symmetry which passes through the optical element and which is tilted relative to the central optical path at a location where the central optical path and the axis of symmetry intersect within the optical element; and
an aircraft including an aircraft fuselage to which the dome window is affixed and which encloses at least a portion of the optical system, wherein the dome window is affixed to a side of the fuselage, wherein the refractive optical element comprises a lens having a shape that is not responsive to a shape of the dome window, and wherein the optical system includes a mirror that reflects the optical path into an interior of the fuselage.

21. The system of claim 20, wherein the optical system comprises an optical transceiver on the central optical path.

22. The system of claim 20, wherein the aircraft is unmanned.

* * * * *